(12) United States Patent
Coleman et al.

(10) Patent No.: US 7,661,263 B2
(45) Date of Patent: Feb. 16, 2010

(54) METHOD OF OPERATING AN INTERNAL COMBUSTION ENGINE

(75) Inventors: Gerald N. Coleman, Dunlap, IL (US);
James J Driscoll, Dunlap, IL (US);
Kevin Duffy, Metamora, IL (US);
Dennis L Endicott, Peoria, IL (US);
Stephen A Faulkner, Stamford (GB);
Jonathan Kilkenny, Peoria, IL (US);
Maarten Verkiel, Metamora, IL (US)

(73) Assignee: Caterpillar, Inc., Peoria, IL (US)

( * ) Notice: Subject to any disclaimer, the term of this patent is extended or adjusted under 35 U.S.C. 154(b) by 843 days.

(21) Appl. No.: 10/928,425

(22) Filed: Aug. 27, 2004

(65) Prior Publication Data
US 2006/0042233 A1 Mar. 2, 2006

(51) Int. Cl.
*F01N 3/00* (2006.01)
(52) U.S. Cl. .............................. 60/285; 60/274; 60/287; 60/297
(58) Field of Classification Search .................. 60/274, 60/276, 285, 286, 287, 288, 295, 297; 123/295, 123/299
See application file for complete search history.

(56) References Cited

U.S. PATENT DOCUMENTS

| 5,517,820 | A | * | 5/1996 | Kuroda et al. ................. 60/274 |
| 5,732,554 | A | * | 3/1998 | Sasaki et al. .................. 60/278 |
| 5,746,989 | A | * | 5/1998 | Murachi et al. ........... 423/213.7 |
| 5,974,791 | A | * | 11/1999 | Hirota et al. ................... 60/276 |
| 6,018,943 | A | * | 2/2000 | Martin et al. .................. 60/274 |
| 6,173,568 | B1 | * | 1/2001 | Zurbig et al. .................. 60/274 |
| 6,213,086 | B1 | | 4/2001 | Chmela et al. |
| 6,233,927 | B1 | * | 5/2001 | Hirota et al. ................... 60/297 |
| 6,240,721 | B1 | * | 6/2001 | Ito et al. ........................ 60/274 |
| 6,276,334 | B1 | | 8/2001 | Flynn et al. |
| 6,463,907 | B1 | | 10/2002 | Hiltner |
| 6,561,157 | B2 | | 5/2003 | zur Loye et al. |
| 6,594,991 | B2 | * | 7/2003 | Itoh et al. ...................... 60/296 |
| 6,823,660 | B2 | * | 11/2004 | Minami ........................ 60/280 |
| 2005/0022513 | A1 | * | 2/2005 | Kitahara ....................... 60/285 |

FOREIGN PATENT DOCUMENTS

| WO | WO 98/10179 A2 | 3/1998 |
| WO | WO 01/86126 | 11/2001 |

OTHER PUBLICATIONS

"Mechanism of the Smokeless Rich Diesel Combustion by Reducing Temperature", Akihama et al., Copyright 2001 Society of Automotive Engineers, Inc.

* cited by examiner

*Primary Examiner*—Tu M Nguyen
(74) *Attorney, Agent, or Firm*—Finnegan, Henderson, Farabow, Garrett & Dunner

(57) ABSTRACT

A method of operating an internal combustion engine includes operating the engine in a first combustion mode. The method also includes switching operation of the engine to a second combustion mode. The method includes directing an exhaust stream of the engine into contact with a NOx adsorber substantially only during the operation in the second combustion mode.

33 Claims, 2 Drawing Sheets

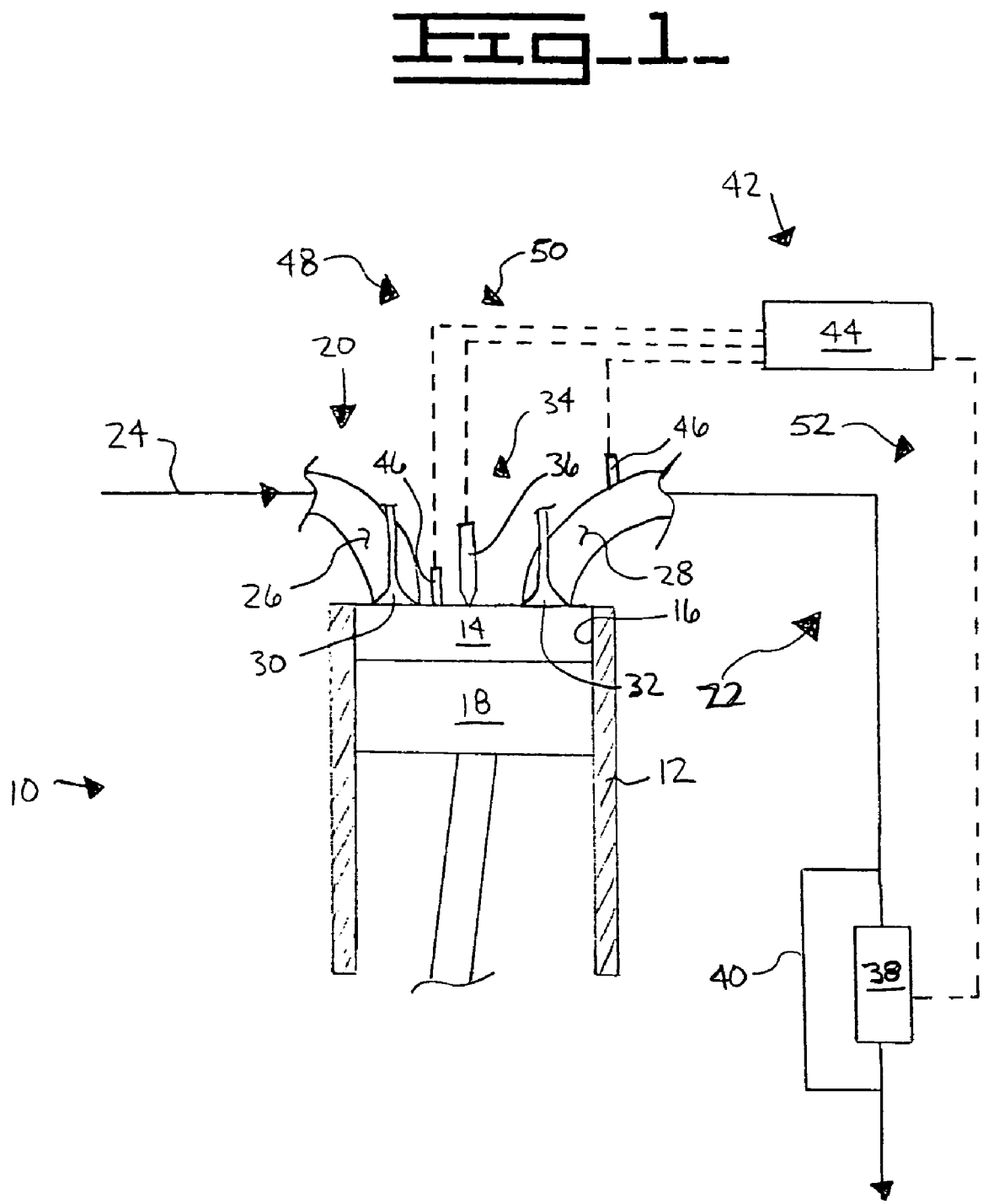

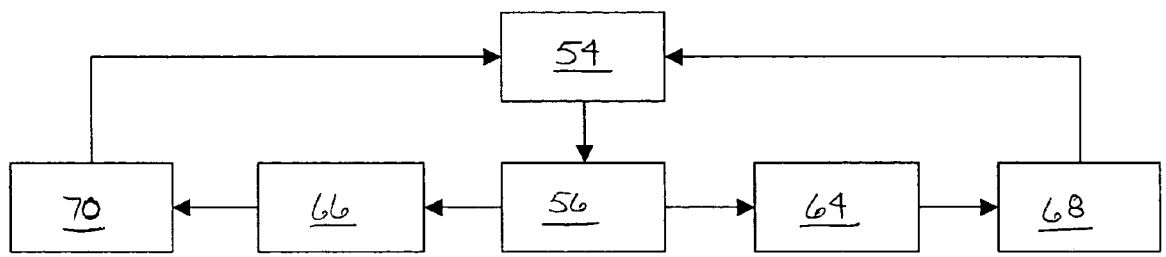
Fig-2-
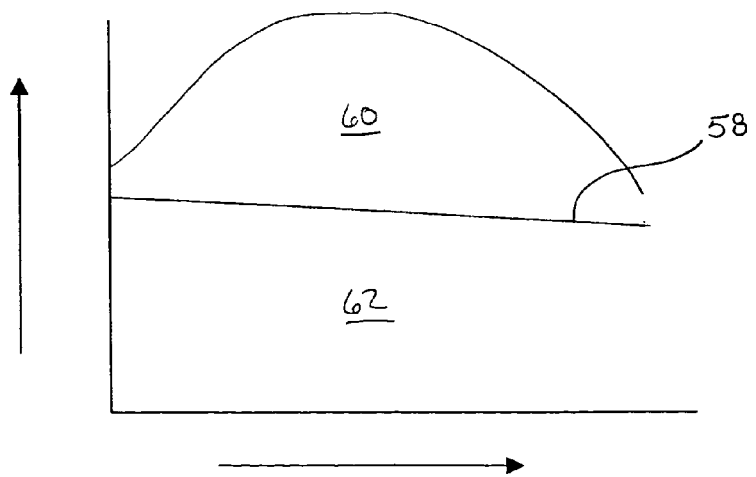
Fig-3-

METHOD OF OPERATING AN INTERNAL COMBUSTION ENGINE

TECHNICAL FIELD

This invention relates generally to an internal combustion engine and more specifically to a method of operating an internal combustion engine in more than one combustion mode.

BACKGROUND

Internal combustion engines are used extensively for a variety of purposes. The transportation infrastructure relies almost exclusively on the use of engines to provide power for mobility. Electrical power generation also relies heavily on internal combustion engines.

The prolific use of engines in our society has created a number of issues, one of which is the ever-increasing amounts of combustion by-products being emitted. Although today's engines operate with much lower emission levels than previous generations of engines, the rapidly increasing numbers of engines being used creates the need to reduce emission levels even more.

Governments around the world recognize this problem and are taking regulatory steps to address the emission levels of engines. For example, levels of oxides of nitrogen (NOx), hydrocarbons (HC), carbon monoxide (CO), and smoke, among others, must be reduced drastically to meet evolving government standards.

Spark ignition engines, by the nature of their operation and the types of fuel used, tend to produce low levels of NOx and particulate emissions. Compression ignition engines, for example diesel engines, generally produce higher levels of NOx and particulate emissions. Diesel engines, however, are still popular in use because they provide higher thermal efficiency than their spark-ignition counterparts, and thus offer higher power output for work applications.

One attempt to reduce the emissions of compression ignition engines has been the use of aftertreatment systems to alter or remove the unwanted emissions from the exhaust of the engines. One form of aftertreatment technology that has shown promise in reducing the NOx emissions of compression ignition engines is NOx adsorber technology, a catalyst technology. However, the successful implementation of NOx adsorber technology has proven difficult. First, for sufficient NOx reduction at low temperatures, NOx adsorbers must have very high loadings of expensive noble metals. In fact, NOx adsorbers that operate successfully in low temperature conditions may require as much as twice the noble metal content of NOx adsorbers that only operate in higher temperature conditions. Second, the effectiveness of NOx adsorber technology in very low temperature conditions is questionable. To improve performance in these conditions, expensive and fuel intensive thermal management may be necessary. Third, the catalyst of a NOx adsorber is poisoned by sulfur, even at the current ultra low sulfur levels in fuel. This poisoning process reduces the overall lifespan of the catalyst.

Another attempt to reduce the emissions of compression ignition engines has been the use of homogeneous charge compression ignition (HCCI) combustion. Engines that operate in HCCI mode have generated much interest due to the potential to operate at high fuel efficiency while generating low combustion emissions. HCCI engines differ from conventional diesel compression ignition engines in that diesel engines ignite fuel that is rich, i.e., highly concentrated, in an area in a combustion chamber, while HCCI techniques create a dispersed homogeneous fuel/air mixture by the time of combustion. Combustion of a homogeneous fuel/air mixture allows an engine to operate such that emission by-products are significantly reduced. However, successful implementation of HCCI combustion at all engine load conditions has proven difficult. In high engine load conditions, HCCI combustion causes high mechanical loading of engine parts due to a higher peak cylinder pressure than traditional diesel combustion. Engine components having commonly used material compositions may not be able to withstand these higher pressures. Also, in order to control the timing of HCCI combustion in higher load conditions, significant structural changes may need to be made to the engine, including, for example, mechanisms for varying the compression ratio of the engine. One strategy for utilizing HCCI combustion is disclosed in U.S. Pat. No. 6,561,157, issued to zur Loye et al. on 13 May 2003. In the '157 patent, PCCI combustion, similar to HCCI combustion, is used during some portions of an engine's operation, and other combustion modes, such as standard diesel mode, spark ignited mode, and homogeneous charge duel fuel transition mode, are used during other portions of the engine's operation.

The present invention is directed to overcoming one or more of the problems as set forth above.

SUMMARY OF THE INVENTION

In one embodiment of the present invention, a method of operating an internal combustion engine comprises operating the engine in a first combustion mode. The method also includes switching operation of the engine to a second combustion mode. The method includes directing an exhaust stream of the engine into contact with a NOx adsorber substantially only during the operation in the second combustion mode.

In another embodiment of the present invention, a method of operating an internal combustion engine comprises operating the engine in a first combustion mode. The method also includes switching operation of the engine to a second combustion mode. The method includes directing an exhaust stream of the engine into contact with a NOx adsorber during any combustion mode other than the first combustion mode.

In yet another embodiment of the present invention, a method of operating an internal combustion engine comprises causing an exhaust stream of an engine, where the engine is capable of selectively operating in an HCCI combustion mode and at least one other combustion mode, to contact a NOx adsorber substantially only during the at least one other combustion mode.

In a further embodiment of the invention, an internal combustion engine comprises an engine body defining a combustion chamber. An exhaust stream exits the combustion chamber. A fuel system is connected to the engine body. The fuel system is adapted to deliver an HCCI fuel charge to the combustion chamber. The fuel system is also adapted to deliver at least one other fuel charge to the combustion chamber. The engine includes a NOx adsorber positioned to be in fluid communication with the exhaust stream substantially only when the fuel system delivers the at least one other fuel charge to the combustion chamber.

In yet a further embodiment of the invention, an internal combustion engine comprises an engine body defining a combustion chamber. An exhaust stream exits the combustion chamber. A NOx adsorber is positioned to selectively contact the exhaust stream. The engine includes means for operating the engine in a first combustion mode. The engine also includes means for switching operation of the engine to a second combustion mode. The engine includes means for directing the exhaust stream into contact with the NOx adsorber substantially only during the operation in the second combustion mode.

In another embodiment of the invention, a method of operating an internal combustion engine comprises operating the engine in a first combustion mode during which a first exhaust stream is produced. The first exhaust stream has a first concentration of NOx that is less than or equal to a predetermined reference NOx concentration. The method also includes switching operation of the engine to a second combustion mode during which a second exhaust stream is produced. The second exhaust stream has a second concentration of NOx that is greater than the predetermined reference NOx concentration. The method further includes directing the second exhaust stream into contact with at least one NOx adsorber. The method includes removing NOx from the second exhaust stream when the second exhaust stream is in contact with the at least one NOx adsorber to create a treated exhaust stream. The treated exhaust stream has a concentration of NOx that is less than or equal to the predetermined reference NOx concentration.

BRIEF DESCRIPTION OF THE DRAWINGS

FIG. 1 is a schematic depiction of an internal combustion engine;

FIG. 2 is a flow diagram of a method of operation of the engine of FIG. 1; and

FIG. 3 is a graph of combustion modes of the engine of FIG. 1 as a function of engine load and engine speed.

DETAILED DESCRIPTION

Referring to FIG. 1, there is shown a schematic depiction of an internal combustion engine 10. The engine 10 includes an engine body 12 defining a combustion chamber 14. The engine body 12 may include a cylinder block (not shown) and a cylinder head (not shown) attached to the cylinder block, or other engine structures known in the art. The engine body 12 defines a cylinder 16 within which a piston 18 is disposed. The piston 18 is in contact with the combustion chamber 14. The engine 10 also includes an intake system 20 for delivering intake air or a combination of intake air and fuel to the combustion chamber 14 and an exhaust system 22 permitting an exhaust stream to exit the combustion chamber 14. Although only one cylinder 16 is illustrated in FIG. 1, the present invention may be utilized in internal combustion engines 10 of various configurations including engines 10 having any number of cylinders 16, for example, four, five, six, eight, ten, twelve or sixteen cylinders 16. In addition, although the engine 10 is primarily discussed with reference to a four-stroke engine 10, in another embodiment the engine 10 may be in the form of a two-stroke engine 10.

In the embodiment of FIG. 1, the intake system 20 includes an intake manifold 24 and an intake port 26 for directing intake air or an air/fuel mixture into the combustion chamber 14. Likewise, the exhaust system 22 includes an exhaust port 28 for directing exhaust gas as described hereinbelow. One or more intake valves 30 and one or more exhaust valves 32 are positioned in the respective ports, 26 and 28, and moved between open and closed positions by a conventional valve control system, or a variable valve timing system, to control the flow of intake air or air/fuel mixture into, and the exhaust stream out of, the combustion chamber 14, respectively.

The engine 10 has a fuel system 34 connected to the engine body 12. In the embodiment of FIG. 1, the fuel system 34 includes a fuel injector 36 for injecting fuel into the combustion chamber 14. The fuel system 34 is adapted to deliver a diesel fuel charge into the combustion chamber 14. The delivery of a diesel fuel charge typically includes the direct injection of a quantity of fuel into the combustion chamber 14 when the piston 18 is near a top dead center position. The delivery of a diesel fuel charge may include any other method that results in combustion via compression ignition of a highly concentrated area of fuel within the combustion chamber 14 creating a self-propagating flame front.

The fuel system 34 is also adapted to deliver an HCCI fuel charge into the combustion chamber 14. The delivery of an HCCI charge may include delivering an early pilot quantity of fuel into the combustion chamber 14, i.e. injecting a quantity of fuel into the combustion chamber 14 prior to the piston 18 reaching the top dead center position. The delivery of an HCCI charge may include delivering a first quantity of fuel into the combustion chamber 14 at a first angle of dispersion and delivering a second quantity of fuel into the combustion chamber 14 at a second angle of dispersion. The delivery of an HCCI charge may include creating a substantially homogeneous mixture of air and fuel outside of the combustion chamber 14 and then delivering the homogeneous mixture into the combustion chamber 14. The creation of the homogeneous mixture may be accomplished by injecting fuel into the intake manifold 24 of the engine 10 or at the intake port 26 of the engine 10. The delivery of an HCCI charge may include any combination of these methods, or any other method capable of producing within the combustion chamber 14 prior to combustion a combustible mixture, the majority of which is ignitable by compression ignition without the presence of a self-propagating flame front. The fuel system 34 may also be adapted to deliver any other type of fuel charge into the combustion chamber 14.

The engine 10 is adapted to selectively operate in a first combustion mode and a second combustion mode. The engine 10 may also be adapted to operate in one or more additional combustion modes. In one embodiment, the first combustion mode is an HCCI combustion mode, i.e. the mode in which the fuel system 34 delivers an HCCI fuel charge to the combustion chamber 14. The second combustion made may be a diesel combustion mode, i.e. the mode in which the fuel system 34 delivers a diesel charge to the combustion chamber 14.

The engine 10 includes at least one NOx adsorber 38 positioned to contact the exhaust stream of the engine 10. In one embodiment, the NOx adsorber 38 is positioned to be in contact with the exhaust stream substantially only when the exhaust stream is the result of combustion of a type of fuel charge other than an HCCI fuel charge. In another embodiment, the NOx adsorber 38 is positioned to be in contact with the exhaust stream during each combustion mode of the engine 10. The exhaust system 22 may include a bypass path 40 that enables the exhaust stream to be routed around the NOx adsorber 38. As used herein, the term "NOx adsorber" means any structure, technology, or system capable of storing NOx from the exhaust stream of the engine 10 for a limited time and, after a certain portion of a NOx storage capacity is filled, converting some or all of the stored NOx into nitrogen.

The engine 10 also includes a control system 42, which includes an electronic control unit (ECU) 44. The control system 42 includes at least one sensor 46 adapted to sense a condition of the engine 10 and report the condition to the ECU 44. The at least one sensor 46 may be located upstream, downstream, or at least partially within the NOx adsorber 38.

In one embodiment, the at least one sensor 46 is adapted to sense a load condition of the engine 10. In other embodiments, the at least one sensor 46 may be adapted to sense a speed condition, a temperature condition, or some other condition that would aid the control system 42 in effectively controlling combustion of the engine 10. The control system 42 is capable of processing the information from the at least one sensor 46 and providing control signals to the appropriate engine components to effectively control operation of the engine 10 during each of the combustion modes and to achieve effective and efficient transfer of engine operation between the combustion modes. The control system 42 is also capable of processing the information from the at least one sensor 46 and providing control signals to the appropriate engine components to effectively control regeneration cycles of the NOx adsorber 38. The control system 42 is adapted to select between, and instruct the fuel system 34 to deliver, an HCCI fuel charge and other types of fuel charges, including a diesel fuel charge. This selection by the control system 42 may be in response to the report of the engine condition provided by the at least one sensor 46.

The engine 10 includes a means for operating 48 the engine 10 in the first combustion mode. The means for operating 48 may include the fuel system 34, the control system 42, and/or other structures that enable the engine 10 to operate in the first combustion mode. The engine 10 also includes a means for switching 50 operation of the engine 10 to the second combustion mode. The means for switching 50 may include the control system 42, the ECU 44, the at least one sensor 46 and/or other structures that enable the engine 10 to switch from the first combustion mode to the second combustion mode. The engine 10 includes a means for directing 52 the exhaust stream into contact with the NOx adsorber 38 substantially only during operation of the engine 10 in the second combustion mode. The means for directing 52 may include the exhaust system 22, the exhaust port, 28, the bypass path 40, and/or other structures that enable the engine 10 to place the NOx adsorber 38 into contact with the exhaust stream substantially only during the second combustion mode.

INDUSTRIAL APPLICABILITY

During operation of the engine 10, the engine 10 selectively operates in different combustion modes. In one embodiment of a method of operation of the engine 10, the NOx adsorber 38 is placed into contact with the exhaust stream only during certain combustion modes. In one method, the engine 10 operates in a first combustion mode. The exhaust stream exits the combustion chamber 14 and does not contact the NOx adsorber 38. The operation of the engine 10 is then switched to a second combustion mode. The switching process may be a direct transition from the first combustion mode to the second combustion mode, or the engine 10 may operate in one or more other combustion modes between the first combustion mode and the second combustion mode, including a partial-HCCI combustion mode, i.e. a combustion mode in which combustion consists of the combustion of a partial HCCI fuel charge and a conventional diesel fuel charge. In one embodiment of the method, the exhaust stream is directed into contact with the NOx adsorber 38 substantially only when the engine 10 is operating in the second combustion mode. In another embodiment, the exhaust stream of the engine 10 is directed into contact with the NOx adsorber 38 during any combustion mode other than the first combustion mode. In one embodiment of the method, the first combustion mode is the HCCI combustion mode. The second combustion mode is not the HCCI combustion mode. For example, the second combustion mode may be the diesel combustion mode.

One method of operation of the engine 10 will be explained by reference to the flow diagram of FIG. 2. In a first control block 54, the at least one sensor 46 of the control system 42 senses at least one condition of the engine 10, such as a load condition, speed condition, or temperature condition. The at least one sensor 46 sends a signal to the ECU 44 delivering the status of the condition. In the remainder of the explanation of the method of operation illustrated in the flow diagram of FIG. 2, the at least one condition will be the load condition of the engine 10. However, in other methods, other conditions may be sensed and reported.

In a second control block 56, the ECU 44 compares the status of the load condition to a reference condition 58. The reference condition 58 may be either an upper threshold of a low load condition or a lower threshold of an upper load condition. In one embodiment, the reference condition 58 is approximately 50% engine load. In another embodiment, the reference condition 58 is between 40% engine load and 60% engine load. In another embodiment, the reference condition 58 is between 25% engine load and 75% engine load. One of ordinary skill in the art will recognize that the reference condition 58 may be chosen based upon the desired operation of the engine 10. In addition, the reference condition 58 may be dependent upon other conditions of the engine 10, as shown in the graph of FIG. 3. FIG. 3, having engine load along the Y-axis and engine speed along the X-axis, shows the reference condition 58 as dependent upon the engine load and the engine speed. The area 60 below the line indicating the reference condition 58 is defined as the low load condition. The area 62 above the line indicating the reference condition 58 is defined as the high load condition. If the load condition of the engine 10 reported by the at least one sensor 46 is less than the reference condition 58, i.e. the engine 10 is operating in the low load condition, the method proceeds to a third control block 64. If the load condition of the engine 10 is greater than the reference condition 58, i.e. the engine 10 is operating in the high load condition, the method proceeds to a fourth control block 66.

In the third control block 64, the control system 42 selects the first combustion mode of the engine 10. In one embodiment, the first combustion mode is the HCCI combustion mode. The control system 42 sends a signal to the fuel system 34 causing the fuel system 34 to deliver an HCCI fuel charge to the combustion chamber 14. The method then proceeds to a fifth control block 68. In the fifth control block 68, the control system 42 causes the exhaust stream of the engine 10 to not be in contact with the NOx adsorber 38. The exhaust stream may avoid the NOx adsorber 38 via the bypass path 40 of the exhaust system 22. The method then returns to the first control block 54.

In the fourth control block 66, the control system 42 selects a combustion mode other than the first combustion mode of the engine 10. The control system 42 may select the second combustion mode, which may be the diesel combustion mode. In the diesel combustion mode, the control system 42 sends a signal to the fuel system 34 causing the fuel system 34 to deliver a diesel fuel charge to the combustion chamber 14. The method then proceeds to a sixth control block 70. In the sixth control block 70, the control system 42 causes the exhaust stream to be in contact with the NOx adsorber 38. The method then returns to the first control block 54.

As the method of operation of the engine 10 diagrammed in FIG. 2 is followed, the engine 10 may switch operation from the first combustion mode to the second combustion mode. For example, if the engine 10 is running in HCCI combustion mode and the at least one sensor 46 senses a load condition in the first control block 54 that is greater than the reference condition 58, e.g. the upper threshold of the low load condition, the engine operation will be switched in the fourth control block 66 from the HCCI combustion mode to some other mode, such as the diesel combustion mode. Additionally, during operation the engine 10 may switch from the second combustion mode to the first combustion mode. For example, if the engine 10 is running in a non-HCCI combustion mode, such as the diesel combustion mode, and the at least one sensor 46 senses a load condition in the first control block 54 that is less than the reference condition 58, e.g. the lower threshold of the high load condition, the engine operation will be switched in the third control block 64 from the non-HCCI combustion mode to the HCCI combustion mode. Therefore, the switching of the engine 10 from one combustion mode to another is dependent upon a condition of the engine 10, e.g. the load condition of the engine 10.

One of ordinary skill in the art will recognize that the method set forth in FIG. 2 is one of several methods that may be used to control the operation of the engine 10. In addition, the graph of FIG. 3 is not the only method of determining when the engine 10 should switch from one combustion mode to another. For example, the reference condition 58 may not be linear or it may not depend upon speed. Alternatively, the information used to determine when the engine 10 should switch combustion modes may depend on other factors, such as engine speed and/or temperature, and may be depicted in other forms, such as a map, a lookup table and the like.

In another embodiment of a method of operation of the engine 10, the engine 10 operates in a first combustion mode during which combustion produces a first exhaust stream having a first concentration of NOx. The first concentration of NOx is less than or equal to a predetermined reference NOx concentration. Examples of the predetermined reference NOx concentration include, but are not limited to, 3 grams per brake-horsepower-hour, 1.5 grams per brake-horsepower-hour, and 0.2 grams per brake-horsepower-hour. Several factors may influence the value of the predetermined reference NOx concentration, including end-user specifications and government regulations, such as those promulgated by the United States Environmental Protection Agency. In one embodiment, the first combustion mode is an HCCI combustion mode, and in another embodiment, the first combustion mode is a partial-HCCI combustion mode.

In the method of operation of the engine 10, the engine 10 is switched to a second combustion mode during which combustion produces a second exhaust stream having a second concentration of NOx. The second concentration of NOx is greater than the predetermined reference NOx concentration. In one embodiment, the second combustion mode is not an HCCI combustion mode. For example, the second combustion mode may be a diesel combustion mode.

In the method of operating the engine 10, the second exhaust stream is directed into contact with at least one NOx adsorber 38. While the second exhaust stream is in contact with the at least one NOx adsorber 38, NOx is removed from the second exhaust stream to create a treated exhaust stream having a concentration of NOx that is less than or equal to the predetermined reference NOx concentration.

In one method of operation of the engine 10, the first exhaust stream may bypass the at least one NOx adsorber 38, such as via the bypass path 40 of the exhaust system 22. An alternative method of operation includes directing the first exhaust stream into contact with the at least one NOx adsorber 38. In this alternative method, the at least one NOx adsorber may be regenerated when the at least one NOx adsorber is in contact with the first exhaust stream. Such regeneration may be accomplished by adjusting the first combustion mode to run rich. Such adjustment of the operation of the first combustion mode may be controlled by the control system 42. In addition, the switching of operation between the first combustion mode and the second combustion mode may be controlled, as discussed above, by the control system 42.

The capabilities of the engine 10 a) to operate selectively in more than one combustion mode and b) to selectively incorporate a NOx adsorber 38 to treat the exhaust stream of the engine 10 enables the strengths of both NOx adsorber technology and HCCI combustion to be utilized while avoiding many of the weaknesses. By operating the engine 10 in HCCI combustion mode primarily at low load or low temperature conditions, the engine 10 will not face the high cylinder pressures caused by high load HCCI combustion. Therefore, engine components having commonly used material compositions may be used in the engine 10. In addition, the aforementioned significant structural changes, such as the introduction of mechanisms for varying the compression ratio of the engine 10, may not need to be incorporated.

Because HCCI combustion produces lower levels of emissions than standard diesel combustion, the NOx adsorber 38 may not need to treat the exhaust stream created by the HCCI combustion process. The NOx adsorber 38 need only be utilized when the engine 10 is operating at higher loads and/or temperatures in a non-HCCI combustion mode, such as the diesel combustion mode. Used in such a manner, the NOx adsorber 38 may have lower loadings of expensive PGM. Also, the difficulties of operating the NOx adsorber 38 at very low temperature conditions may be avoided. In addition, because the NOx adsorber 38 is not contacting the exhaust stream of the engine 10 during the entire running time of the engine 10, the rate of sulfur poisoning of the NOx adsorber 38 is reduced and the effective lifespan of the NOx adsorber 38 is increased.

Other aspects, objects, and advantages of this invention can be obtained from a study of the drawings, the disclosure, and the appended claims.

What is claimed is:

1. A method of operating an internal combustion engine, comprising:
   causing an exhaust stream of an engine, said engine capable of selectively operating in an HCCI combustion mode and at least one other combustion mode, to contact a NOx adsorber substantially only during said at least one other combustion mode.

2. A method of operating an internal combustion engine, comprising:
   operating said engine in a first combustion mode;
   switching operation of said engine to a second combustion mode; and
   directing an exhaust stream of said engine into contact with a NOx adsorber during any combustion mode other than said first combustion mode.

3. A method of operating an internal combustion engine, comprising:
   operating said engine in a first combustion mode;
   switching operation of said engine to a second combustion mode; and
   substantially only during said operation in said second combustion mode, directing an exhaust stream of said engine into contact with a NOx adsorber.

4. The method of claim 3 wherein said second combustion mode is not an HCCI combustion mode.

5. The method of claim 4 wherein said second combustion mode is a diesel combustion mode.

6. The method of claim 3 wherein said first combustion mode is an HCCI combustion mode.

7. The method of claim 6 wherein said operating in said HCCI combustion mode includes delivering an HCCI fuel charge into a combustion chamber of said engine.

8. The method of claim 7 wherein said delivering said HCCI fuel charge includes delivering an early pilot quantity of fuel into said combustion chamber.

9. The method of claim 7 wherein said delivering said HCCI fuel charge includes delivering a first quantity of fuel into said combustion chamber at a first angle of dispersion and delivering a second quantity of fuel into said combustion chamber at a second angle of dispersion.

10. The method of claim 7 wherein delivering said HCCI fuel charge includes creating a substantially homogeneous mixture of air and fuel outside of said combustion chamber and delivering said homogeneous mixture into said combustion chamber.

11. The method of claim 3 including changing operation of said engine from said second combustion mode to said first combustion mode.

12. The method of claim 11 wherein said changing operation to said first combustion mode occurs at a lower threshold of a high load condition.

13. The method of claim 12 wherein said lower threshold of said high load condition is between 25% load and 75% load.

14. The method of claim 13 wherein said lower threshold of said high load condition is between 40% load and 60% load.

15. The method of claim 14 wherein said lower threshold of said high load condition is approximately 50% load.

16. The method of claim 3 including sensing at least one condition of said engine.

17. The method of claim 16 wherein said switching operation to said second combustion mode is dependent upon said at least one condition of said engine.

18. The method of claim 16 wherein said at least one condition is at least one of a speed condition and a temperature condition.

19. The method of claim 18 wherein said switching operation to said second combustion mode is dependent upon at least one of said speed condition and said temperature condition.

20. The method of claim 16 wherein said at least one condition is a load condition of said engine.

21. The method of claim 20 wherein said operation of said engine in said second combustion mode coincides with said engine operating in a high load condition.

22. The method of claim 20 wherein said operating in said first combustion mode coincides with said engine operating in a low load condition.

23. The method of claim 22 wherein said switching operation to said second combustion mode occurs at an upper threshold of said low load condition.

24. The method of claim 23 wherein said upper threshold of said low load condition is between 25% load and 75% load.

25. The method of claim 24 wherein said upper threshold of said low load condition is between 40% load and 60% load.

26. The method of claim 25 wherein said upper threshold of said low load condition is approximately 50% load.

27. An internal combustion engine, comprising:
an engine body defining a combustion chamber from which an exhaust stream exits;
a NOx adsorber positioned to selectively contact said exhaust stream;
means for operating said engine in a first combustion mode;
means for switching operation of said engine to a second combustion mode; and
means for directing, substantially only during said operation in said second combustion mode, said exhaust stream into contact with said NOx adsorber.

28. An internal combustion engine, comprising:
an engine body defining a combustion chamber from which an exhaust stream exits;
a fuel system connected to said engine body, said fuel system adapted to deliver an HCCI fuel charge to said combustion chamber, said fuel system adapted to deliver at least one other fuel charge to said combustion chamber; and
a NOx adsorber positioned to contact said exhaust stream substantially only when said exhaust stream is the result of combustion of said at least one other fuel charge.

29. The internal combustion engine of claim 28 including a control system adapted to select between said HCCI fuel charge and said at least one other fuel charge.

30. The internal combustion engine of claim 29 including at least one sensor connected to said control system, said at least one sensor adapted to sense at least one condition of said engine and report said at least one condition to said control system.

31. The internal combustion engine of claim 30 wherein said at least one condition is a load condition of said engine.

32. The internal combustion engine of claim 30 wherein said at least one condition is at least one of a speed condition and a temperature condition.

33. The internal combustion engine of claim 30 wherein said control system is adapted to select between said HCCI fuel charge and said at least one other fuel charge in response to said report of said at least one condition.

\* \* \* \* \*